United States Patent [19]

Nagase

[11] Patent Number: 5,343,344
[45] Date of Patent: Aug. 30, 1994

[54] CONNECTION OF TRANSDUCER LEADS TO A PRINTED CIRCUIT BOARD IN ROTATING DISK DATA STORAGE APPARATUS

[75] Inventor: Fumio Nagase, Tama, Japan

[73] Assignee: Teac Corporation, Tokyo, Japan

[21] Appl. No.: 875,454

[22] Filed: Apr. 29, 1992

[30] Foreign Application Priority Data

May 8, 1991 [JP] Japan .............................. 3-041301[U]

[51] Int. Cl.$^5$ ............................ G11B 5/48; G11B 5/52
[52] U.S. Cl. ...................................... 360/104; 360/108
[58] Field of Search ..................... 360/104, 109, 130.3, 360/103, 108; 361/398

[56] References Cited

U.S. PATENT DOCUMENTS

| | | | |
|---|---|---|---|
| 4,432,027 | 2/1984 | Huguchi | 360/104 |
| 4,445,157 | 4/1984 | Takahashi | 360/133 |
| 4,520,555 | 9/1982 | Gyi et al. | 360/104 |
| 4,777,551 | 10/1988 | Seki et al. | 360/104 |
| 4,811,140 | 3/1989 | Enami et al. | 360/104 |
| 4,819,108 | 4/1989 | Seki et al. | 360/104 |
| 4,823,217 | 4/1989 | Kato et al. | 360/104 |

FOREIGN PATENT DOCUMENTS

61-227219 10/1986 Japan .

*Primary Examiner*—John H. Wolff
*Assistant Examiner*—David D. Davis
*Attorney, Agent, or Firm*—Woodcock Washburn Kurtz Mackiewicz & Norris

[57] ABSTRACT

A disk drive has a pair of transducers mounted to respective planar flexure seats for data transfer with the opposite sides of a rotating flexible magnetic disk. The transducers have their leads electrically connected to flexible printed circuit boards generally disposed on the back sides of the flexure seats, opposite to the front sides on which the transducers are mounted. Since the soldering of the transducer leads to the circuit boards on the back sides of the flexure seats, which has been the case heretofore, makes it difficult to reduce the thickness of the disk drive to an absolute minimum, each circuit board is shaped to include a pair of end portions extending through openings in one associated flexure seat and disposed on the front side of the flexure seat. The transducer leads are soldered to the end portions of the circuit boards on the front sides of the flexure seats.

6 Claims, 4 Drawing Sheets

CONNECTION OF TRANSDUCER LEADS TO A PRINTED CIRCUIT BOARD IN ROTATING DISK DATA STORAGE APPARATUS

BACKGROUND OF THE INVENTION

This invention relates generally to apparatus for data transfer with a rotating data storage disk such as a flexible magnetic disk of three and a half inch diameter packaged in cassette form. More specifically, the invention pertains, in such rotating disk data storage apparatus, to an improved electrical connection of transducer leads to a flexible printed circuit board or equivalent conductor means.

The three and a half inch flexible magnetic disk and a disk drive for use therewith are both described and claimed in U.S. Pat. No. 4,445,157 to Takahashi. The magnetic disk is rotatably housed in a generally flat, boxlike envelope of relatively rigid plastic material, complete with a metal made sliding shutter, to make up a disk cassette. The envelope has a pair of apertures of rectangular shape to expose radial portions of the opposite sides of the magnetic disk. The sliding shutter also has a pair of apertures of approximately the same shape and size as the envelope apertures, which shutter apertures come into and out of register with the envelope apertures. The magnetic disk has a rigid hub of magnetic sheet metal attached centrally thereto. The hub has defined therein a central opening of square shape and an eccentric opening of rectangular shape.

When positioned in the associated disk drive, the magnetic disk has its central hub placed on a turntable which is much less in diameter than the disk. The turntable has a permanent magnet mounted thereon for attracting the disk hub. Disposed centrally on the turntable, a spindle engages in the central opening in the disk hub for centering the disk on turntable. A drive pin is disposed eccentrically on the turntable for driving engagement in the eccentric opening or slot in the disk hub, imparting the rotation of the turntable to the magnetic disk.

The disk drive for use with the three and a half inch disk has a pair of data transducers or read/write heads for data transfer with the opposite sides of the disk through the registered apertures in the envelope and the shutter. As disclosed in U.S. Pat. No. 4,811,140 to Enami et al., assigned to the assignee of the instant application, one of the transducers is mounted via a planar flexure seat on a carriage movable radially of the disk. The other transducer is mounted via another planar flexure seat on a load arm which is hingedly mounted on the carriage for pivotal motion toward and away from the disk.

Usually, with this type of disk drive, the leads of each transducer were soldered to a conductive pattern on a flexible printed circuit board disposed on that side of the associated flexure seat opposite to the one on which the transducer was mounted. Each soldered connection rose to a height of 0.3 to 0.6 millimeter. Negligible as it might seem, the solder of such height represented a serious inconvenience in reducing the thickness of the disk drive to an absolute minimum, as is the current trend.

It might be contemplated to dispose the flexible printed circuit boards on the same side of the flexure seats as the transducers. This solution is unsatisfactory, however, because the circuit boards might then contact the envelope of the disk cassette. Particularly in the case where the envelope has the metal made sliding shutter, the conductive patterns on the circuit board might be short circuited to the destruction of the transducers.

SUMMARY OF THE INVENTION

The present invention solves the problem, in rotating disk data storage apparatus of the type defined, of how to electrically connect transducer leads to flexible printed circuit boards or equivalent conductor means so as to make possible the reduction of the thickness of the apparatus to an absolute minimum.

Briefly, the invention concerns an apparatus for data transfer with a rotating data storage disk, comprising a substantially planar flexure seat mounted to carriage means movable radially of a data storage disk being held in a preassigned data transfer position within the apparatus. The flexure seat has a first side directed toward the data storage disk and a second side directed away therefrom. Flexible conductor means such as a flexible printed circuit board is generally disposed on the second side of the flexure seat and has an portion disposed on the first side of the flexure seat. A transducer is mounted to the first side of the flexure a seat and has its leads soldered or otherwise electrically connected to the end portion of the flexible conductor means on the first side of the flexure seat.

Of course, for data transfer with both sides of the disk, a pair of transducers may be mounted via respective flexure seats to the carriage means. Two flexible printed circuit boards or like conductor means may then be disposed on the second sides of the respective flexure seats, and the leads of the transducers may be soldered to the end portions of the respective flexible conductor means on the first sides of the flexure seats.

The first sides of the flexure seats, on which the transducers are mounted, have enough spaces to accommodate the soldered joints between the transducer leads and the conductive patterns on the flexible printed circuit boards. Accordingly, the presence of the soldered joints on these sides of the flexure seats presents no bar to the desired reduction of the thickness of the apparatus. Only minimal end portions of the printed circuit boards are disposed on the first sides of the flexure seats, so that these end portions do not interfere with the disk or the disk cassette, either. Preferably, the soldered joints may be positioned so close to the transducers as to be received in the registered apertures in the envelope and shutter of the disk cassette.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
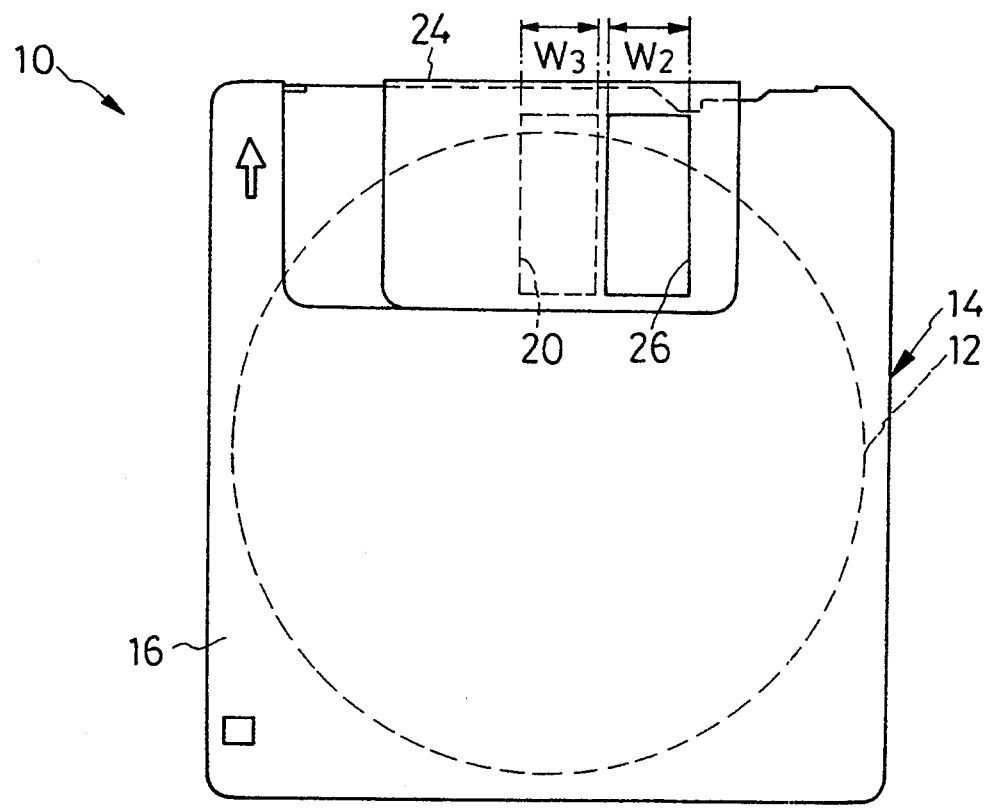
FIG. 1 is a top plan view of the known flexible magnetic disk cassette for use with the apparatus constructed in accordance with the present invention.

The known three and a half inch flexible magnetic disk cassette for use in the practice of this invention will first be briefly described, the better to make clear the features and advantages of the invention. Generally designated 10 in FIGS. 1 and 2, the disk cassette has a flexible magnetic disk 12 rotatably housed in a protective envelope 14 of rigid plastic material. The envelope 14 is of square, rather flat boxlike shape, having a front or top side 16 seen in FIG. 1 and a rear or bottom side 18 seen in FIG. 2.

Formed in both top 16 and bottom 18 sides of the envelope 14 and in the vicinity of one edge thereof, are apertures 20 and 22 of rectangular shape which are in register with each other. The apertures 20 and 22 expose radial portions of the opposite sides of the magnetic disk 12 for data transfer contact with a pair of data transducers or read/write heads of the associated data storage apparatus to be disclosed subsequently.

Normally, the apertures 20 and 22 in the envelope 14 are both closed by a sliding shutter 24 in the form of a rectangular piece of sheet metal bent into the shape of a U and mounted astride one edge of the envelope 14. The shutter 24 has itself two apertures 26 and 28 of approximately the same shape and size as the envelope apertures 20 and 22. The shutter apertures 26 and 28 are out of register with the envelope apertures 20 and 22 when the shutter is in the illustrated right hand position of FIGS. 1 and 2 under the bias of a spring (not shown).

When the disk cassette 10 is loaded in position in the associated apparatus, the shutter 24 will be forced leftwardly of the envelope 14 against the force of the unshown spring. Thereupon the shutter apertures 26 and 28 will come into register with the envelope apertures 20 and 22 thereby exposing the radial portions of the opposite sides of the magnetic disk 12 for data transfer with the data transducers of the apparatus.

Figure 2:
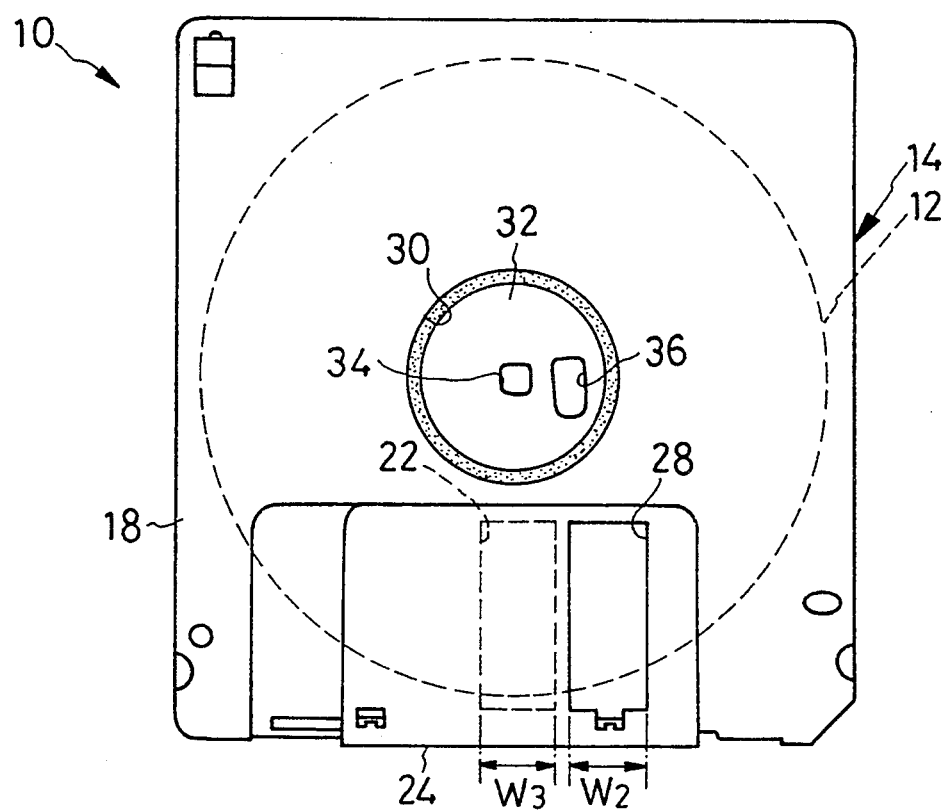
FIG. 2 is a bottom plan view of the magnetic disk cassette of FIG. 1.

The disk cassette 10 is to be placed upon the turntable of the apparatus with the top side 16 of its envelope 14 oriented upwardly. Therefore, as shown in FIG. 2, the bottom side 18 of the envelope 14 has a circular opening 30 formed centrally therein for working engagement of the magnetic disk 12 with the turntable. Exposed through the opening 30 is a hub 32 in the form of a disk of magnetic sheet metal attached centrally to the magnetic disk 1. The hub 32 has defined therein a central opening 34 of square shape and an eccentric opening 36 of rectangular shape.

Figure 3:
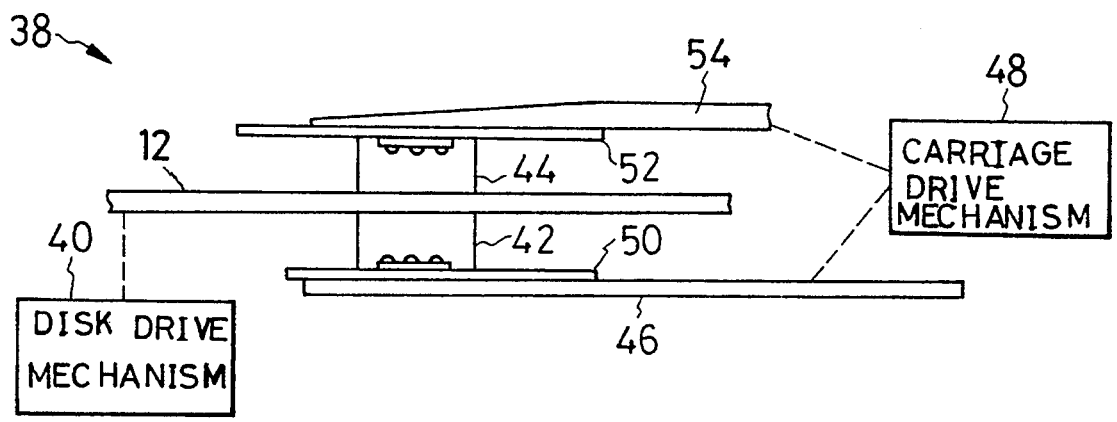
FIG. 3 is a partial side elevation, partly in block form, of the rotating disk data storage apparatus for use with the disk cassette of FIGS. 1 and 2, the apparatus incorporating the teachings of this invention.

Reference is now directed to FIG. 3 for a study of the data storage apparatus 38 for data transfer with the disk cassette 10 of the FIGS. 1 and 2 construction. The apparatus 38 has a disk drive mechanism 40 which is shown in block form because of its conventional nature. In practice the disk drive mechanism 40 may comprise an electric motor coupled directly to an overlying turntable via a drive spindle.

FIG,. 3 shows the disk cassette 10 loaded in the apparatus 38 and held in a preassigned data transfer position therein, with the hub 32, FIG. 2, of the flexible magnetic disk 12 placed concentrically upon the turntable. The drive spindle projects upwardly from the turntable for centering engagement in the central opening 34 in the disk hub 32. A drive pin, not shown, is resiliently and eccentrically mounted to the turntable for driving engagement in the eccentric slot 36 in the disk hub 32, imparting the rotation of the turntable to the magnetic disk 12 within the cassette envelope 14.

The data storage apparatus 38 is conventionally equipped with a pair of data transducers or magnetic read/write heads 42 and 44 for data transfer with the opposite sides of the magnetic disk 12 being held in the data transfer position. The transducers 42 and 44 are both mounted on a carriage 46 for traveling across the annular concentric record tracks, not shown, on the magnetic disk 12.

A carriage drive mechanism 48 for linearly moving the carriage 46 back and forth with the transducers 42 and 44 thereon is also shown as a block because of its conventional nature. An example of carriage drive mechanism comprises a bidirectional motor of the known electric stepping type and a motion translating mechanism such as a lead screw for converting the bidirectional, incremental rotation of the stepping motor into the linear, stepwise, reciprocating motion of the carriage 46.

Although the first or bottom transducer 42 is mounted directly on the carriage 46 via a flexure seat 50, the second or top transducer 44 is mounted via another flexure seat 52 on a distal end of a load arm 54 which in turn is hinged to the carriage 46 for pivotal motion in a plane normal to the plane of the magnetic disk 12 on the turntable. A torsional load spring, not shown, acts on the load arm 54 for loading the top transducer 44 against the bottom transducer 42 via the intervening magnetic disk 12. The load arm 54 with the top transducer 44 thereon is pivoted away from the bottom transducer 42 against the force of the unshown load spring when the disk cassette is being loaded in, and unloaded from, the apparatus 38.

Figure 4:
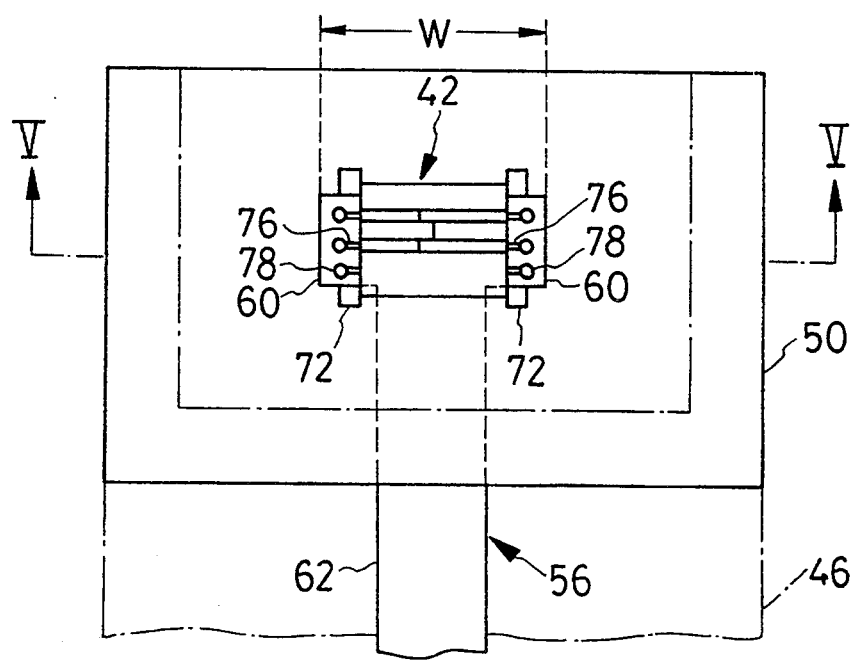
FIG. 4 is an enlarged top plan view of the bottom transducer of the FIG. 2 apparatus, the bottom transducer being shown together with the associated flexure seat and flexible printed circuit board.

Reference may be had to FIGS. 4–7 for the following detailed discussion of how the bottom transducer 42 is electrically connected to a flexible printed circuit board (FPCB) 56 according to the present invention. Made from sheet metal, the flexure seat 50 for the bottom transducer 42 is peripherally secured to the bifurcated end of the carriage 46, as shown in FIG. 4. The bottom transducer 42 is positioned centrally on the flexure seat 50 and affixed thereto by means of an adhesive seen at 58 in FIG. 5.

Figure 7:
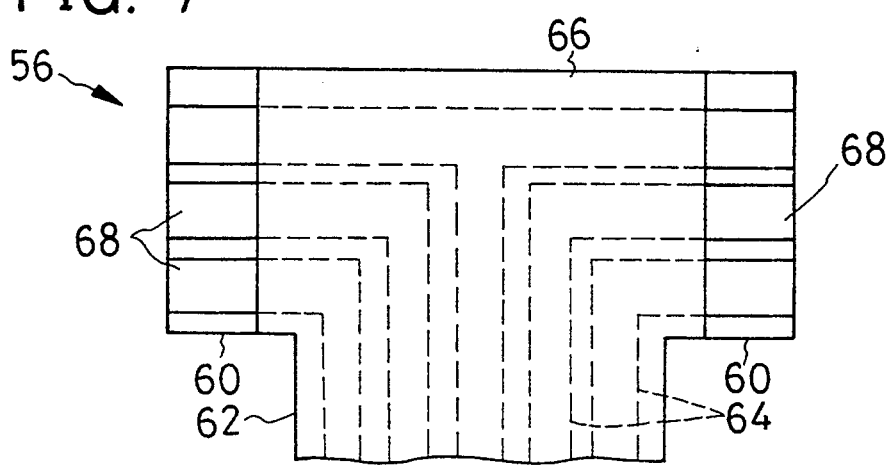
FIG. 7 is an enlarged, partial top plan view of the flexible printed circuit board for the bottom transducer.

As will be noted from FIGS. 4 and 7, the FPCB 56 has a T shaped portion for connection to the bottom transducer 42, comprising a pair of end limbs 60 branching off in opposite directions from a main limb 62. A conductive pattern 64 is conventionally formed on the FPCB 56. An overlay 66 of electrically insulating material covers all of the conductive pattern 64 but its terminal portions 68 on the end limbs 60 of the FPCB 56.

The FPCB 56 is generally disposed on the underside of the flexure seat 50, that is, on that side of the flexure seat opposite to the one on which the bottom transducer 42 is mounted, and secured thereto by means of an adhesive 70. Only the pair of end limbs 60 of the FPCB 56 are inserted in and through a pair of slots 72, FIG. 6, in the flexure seat 50 and bonded at 74, FIG. 5, to the same side of the flexure seat as is the bottom transducer 42.

The bottom transducer 42, as well as the top transducer 44, can be the known tunnel erase head of the same construction as disclosed in is U.S. Pat. No. 4,811,140, supra. The bottom transducer 44 is therefore shown to have six leads 76, with every three of them extending in opposite directions therefrom. The transducer leads 76 are soldered at 78 to the exposed terminal portions 68 of the conductive pattern 64 on the FPCB end limbs 60.

Figure 5:
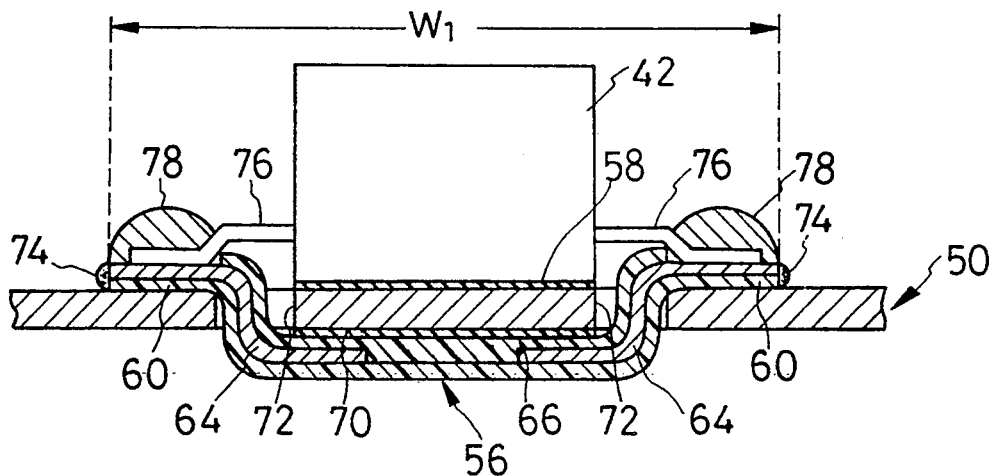
FIG. 5 is a still more enlarged section taken along the line V—V in FIG. 4.
Figure 6:
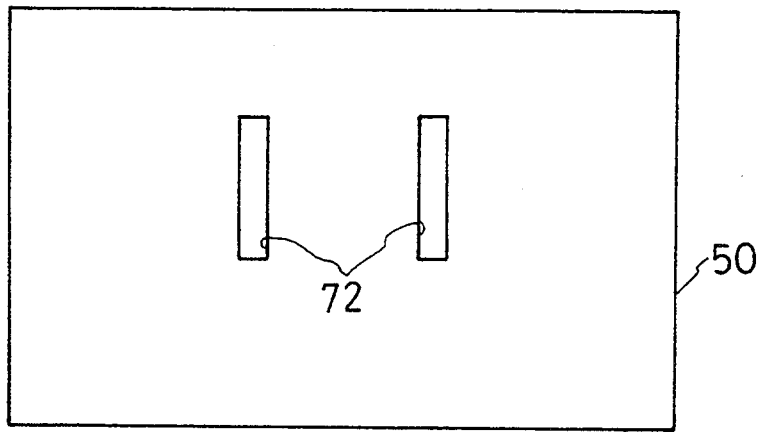
FIG. 6 is a plan view of the flexure seat for the bottom transducer.

In both FIGS. 4 and 5 the soldered joints 78 between the transducer leads 76 and the terminal portions 68 of the conductive pattern 64 are shown exaggerated in size, and spaced considerable distances away from the transducer 42, for the ease of understanding. In fact, however, the soldered joints 78 are very close to the bottom transducer 42, so much so that the width $W_1$ of the bottom transducer inclusive of the soldered joints is less than the width $W_2$, FIGS. 1 and 2, of each shutter aperture 26 or 28, or the width Ifs of each envelope aperture 20 or 22, of the disk cassette 10.

Consequently, when the disk cassette 10 is loaded in position in the apparatus 38, as illustrated in FIG. 3, the bottom transducer 42 together with the soldered joints 78 can be thoroughly received in the registered bottom apertures 22 and 28 of the disk cassette. The soldered joints 78 are therefore not to interfere with the metal made sliding shutter 24 of the disk cassette 10 even though they are situated on the same side of the flexure seat 50 as the bottom transducer 42.

Figure 8:
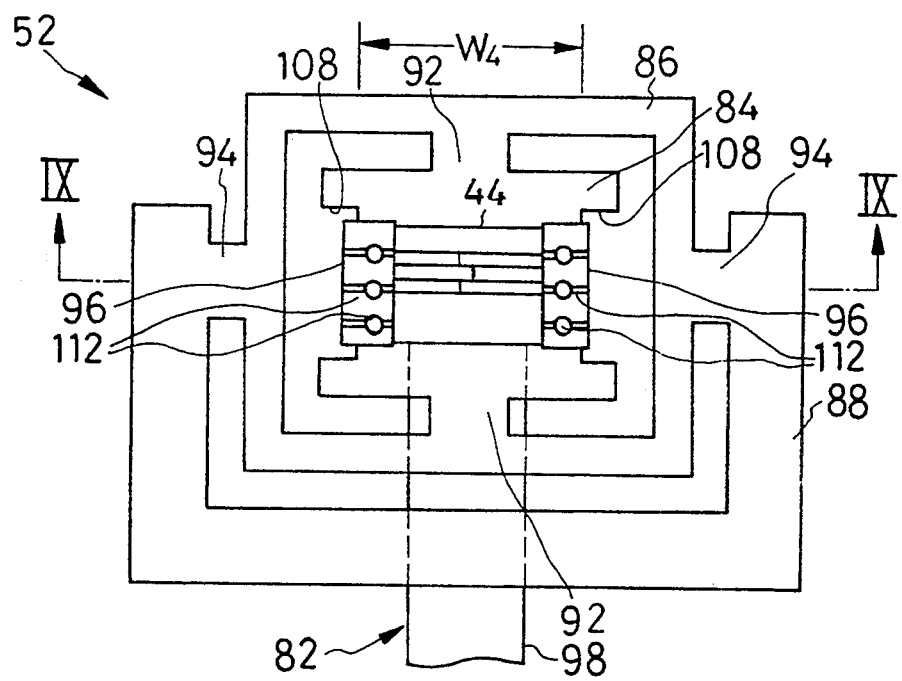
FIG. 8 is an enlarged bottom plan view of the top transducer of the FIG. 2 apparatus, the bottom transducer being shown together with the associated flexure seat and flexible printed circuit board.
Figure 9:
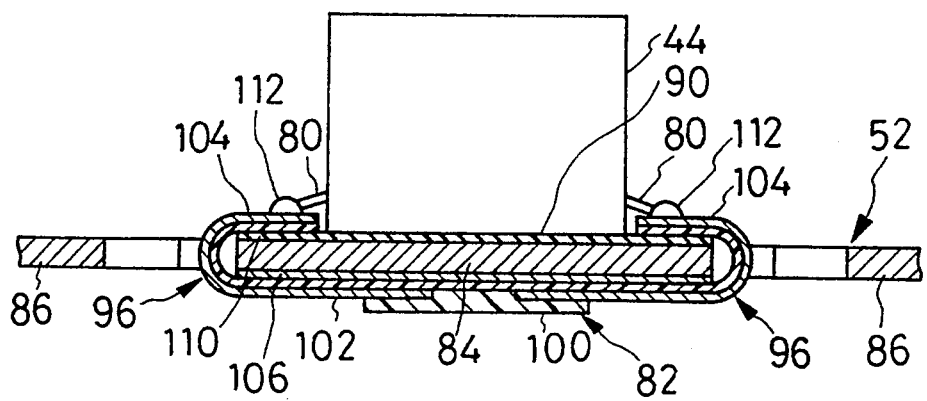
FIG. 9 is a still more enlarged section taken along the line IX—IX in FIG. 8.

FIGS. 8 and 9 illustrate how the top transducer 44 is mounted to the associated flexure seat 52 and how its leads 80 are soldered to an associated FPCB 82. Unlike the flexure seat 50 for the bottom transducer 42, the flexure seat 52 for the top transducer 44 supports the same in a gimbal fashion. The flexure seat 52 can take the form of a sheet metal punching, integrally comprising a generally rectangular central portion 84, an annular portion 86 surrounding the central portion, and a U shaped portion 88 partly surrounding the annular portion, as indicated in FIG. 8.

The central portion 84 of the flexure seat 52, on which the top transducer 44 is mounted via an adhesive layer 90, is joined to the annular portion 86 via a pair of relatively slender bridges 92 arranged collinearly on the opposite sides of the central portion. The annular portion 86 is joined in turn to the U shaped portion 88 via another pair of relatively slender bridges 94 arranged collinearly on the opposite sides of the annular portion and extending in right angular relationship with the fist pair of bridges 92.

The flexure seat 52 of the foregoing configuration is mounted to the load arm 54, FIG. 3, by having its U shaped portion secured to the bifurcated end of the load arm. Consequently, mounted to the central portion 84 of the flexure seat 52, the top transducer 44 is pivotable in any direction about the two orthogonal axes along the two pairs of bridges 92 and 94 of the flexure seat.

FIG. 8 also indicates that the FPCB 82 has a T shaped portion for connection to the top transducer 44, comprising a pair of end limbs 96 branching off in opposite directions from a main limb 98. An overlay 100 of electrically insulating material covers all of a conductive pattern 102 on the FPCB 82 but its terminal portions 104 on the end limbs 96 of the FPCB. The FPCB 82 is similar in construction to the FPCB 56, FIGS. 4 and 5, for the bottom transducer 42 except that the exposed terminal portions 104 of the conductive pattern 102 on the FPCB 82 are longer than the exposed terminal portions 68 of the conductive pattern 64 on the FPCB 56.

The FPCB 82 is generally disposed on the top side of the flexure seat 52, that is, on that side of the flexure seat opposite to the one on which the top transducer 44 is mounted, and secured thereto by means of an adhesive 106. The pair of end limbs 96, however, are bent down, directed through a pair of recesses 108 in the central portion 84 of the flexure seat 52, further bent toward the top transducer 44, and bonded at 110 to the same side of the flexure seat as is the top transducer 44. The transducer leads 80 are soldered at 112 to the exposed terminal portions 104 of the conductive pattern 102 on the same side of the flexure seat 52 as the top transducer 44.

The width $W_4$ of the top transducer 44 inclusive of the soldered joints 112 is also less than the width $W_2$, FIGS. 1 and 2, of each shutter aperture 26 or 28, or the width $W_3$ of each envelope aperture 20 or 22, of the disk cassette 10. Therefore, when the disk cassette 10 is loaded in the apparatus 38 as shown in FIG. 3, the top transducer 44 as well as the soldered joints 112 is thoroughly received in the registered top apertures 20 and 26 of the disk cassette. The soldered joints 112 are not to interfere with the metal made sliding shutter 24, either.

Thus, according to the invention, the leads 76 of the bottom transducer 42 and the leads 80 of the top transducer 44 are both soldered to the respective FPCBs 56 and 82 on the disk side of the flexure seats 50 and 52. The apparatus 38 may therefore be reduced in thickness by twice the height of each soldered joint. The transducers 42 and 44 are much more in height than the soldered joints 78 and 112, so that the presence of the soldered joints on the same side of the flexure seats 42 and 44 as the transducers 42 and 44 constitutes no bar to the thickness reduction of the apparatus 38.

As an additional advantage, the soldering of the transducer leads 76 and 80 is much easier when done on the same side of the flexure seats 50 and 52 as the transducers 42 and 44 than on the other side of the flexure seats.

Although the present invention has been shown and described in the foregoing in very specific aspects thereof, it is not desired that the invention be limited by the exact details of such disclosure. The following, then, is a brief list of possible modifications, alterations and adaptations of the illustrated embodiment which are all believed to fall within the scope of this invention:

(1) The invention could be applied to a data storage apparatus for use with a single sided disk, having but one transducer with its leads connected to an FPCB or like conductor means as taught by this invention.

(2) Not only the top transducer but also the bottom transducer could be gimbaled, with the leads of the bottom transducer connected to the FPCB as shown in FIG. 9.

(3) The top transducer could be monoaxially gimbaled, with the leads of the top transducer connected to the FPCB as shown in FIG. 5.

(4) The transducer leads could be connected to the FPCBs by wire bonding, welding, etc., rather than by soldering.

What is claimed is:

1. An apparatus for data transfer with a data storage disk, comprising:
   (a) drive means for imparting rotation to the data storage disk being held in a preassigned data transfer position within the apparatus;
   (b) carriage means movable radially of the data storage disk in the data transfer position;
   (c) a substantially planar flexure seat mounted to the carriage means, the flexure seat having a first side directed toward the data storage disk in the data transfer position and a second side directed away from the data storage disk;
   (d) there being a pair of spaced slots formed in the flexure seat;
   (e) flexible conductor means generally disposed on the second side of the flexure seat and having a pair of planar end portions which extend through the slots the flexure seat and which are disposed on the first side of the flexure seat; and
   (f) a transducer mounted to the first side of the flexure seat for data transfer with the data storage disk and disposed between the pair of slots therein, the transducer having leads which extend in opposite directions therefrom and which are soldered to the planar end portions of the flexible conductor means on the first side of the flexure seat whereby a reduced overall height or thickness of the apparatus is achieved.

2. The apparatus of claim 1 wherein the planar end portions of the flexible conductor means are bent toward the transducer on the first side of the flexure seat.

3. The apparatus of claim 1 wherein the planar end portions of the flexible conductor means are bent away from the transducer on the first side of the flexure seat.

4. An apparatus for data transfer with a disk cassette including a data storage disk rotatably housed in an envelope having a first pair of generally rectangular apertures of predetermined width to expose radial portions of opposite sides of the disk, the envelope having a sliding shutter with a second pair of apertures formed therein which come into and out of register with the first pair of apertures, the second pair of apertures being of approximately the same shape and size as the first pair of apertures, the apparatus comprising:
   (a) drive means for imparting rotation to the data storage disk of the disk cassette being held in a preassigned data transfer position within the apparatus;
   (b) carriage means movable radially of the data storage disk in the data transfer position;
   (c) a pair of substantially planar flexure seats mounted to the carriage means and disposed on both sides of the data storage disk in the data transfer position, each flexure seat having a first side directed toward the data storage disk and a second side directed away from the data storage disk;
   (d) there being a pair of spaced slots in each flexure seat;
   (e) a pair of flexible printed circuit boards each generally disposed on the second side of one flexure seat and each having a pair of planar end portions which extends respectively through the pair of slots in one flexure seat and which are disposed on the first side of one flexure seat; and
   (f) a pair of transducers mounted respectively to the first sides of the flexure seats for data transfer with the opposite sides of the data storage disk through the first and the second pairs of apertures, each transducer being disposed between the pair of slots in one flexure seat and having leads which extend in opposite directions therefrom and which are soldered respectively to the planar end portions of one flexible printed circuit board on the first side of one flexure seat, each transducer inclusive of soldered joints of the leads thereof to the planar end portions of one flexible printed circuit board having a width less than the width of each of the first and the second pairs of apertures, whereby a reduced overall height or thickness of the apparatus is achieved.

5. The apparatus of claim 4 wherein the pair of planar end portions of at least one flexible printed circuit board are bent toward one associated transducer on the first side of one flexure seat.

6. The apparatus of claim 4 wherein the pair of planar end portions of at least one flexible printed circuit board are bent away from one associated transducer on the first side of one flexure seat.

* * * * *